United States Patent [19]

Chevallier

[11] Patent Number: 5,662,199
[45] Date of Patent: Sep. 2, 1997

[54] FRICTION WHEEL, ESPECIALLY FOR A MOTOR VEHICLE CLUTCH

[75] Inventor: Gisèle Chevallier, Bonnac la Cote, France

[73] Assignee: Valeo, Paris Cedes, France

[21] Appl. No.: 687,256

[22] Filed: Jul. 25, 1996

[30] Foreign Application Priority Data

Jul. 28, 1995 [FR] France .................. 95 09447

[51] Int. Cl.[6] .................................... F16D 13/68
[52] U.S. Cl. .................. 192/107 C; 192/52.6; 192/107 R
[58] Field of Search .............. 192/107 R, 107 C, 192/52.6, 70.13, DIG. 1

[56] References Cited

U.S. PATENT DOCUMENTS

| 4,697,684 | 10/1987 | Maycock et al. | 192/107 R |
| 5,076,409 | 12/1991 | Graton et al. | 192/107 C |
| 5,314,052 | 5/1994 | Henrion | 192/107 C |

FOREIGN PATENT DOCUMENTS

| 1017688 | 12/1952 | France . |
| 2 673 984 | 9/1992 | France . |
| 2 714 432 | 6/1995 | France . |
| 94/19616 | 9/1994 | WIPO . |
| 95/13485 | 5/1995 | WIPO . |

*Primary Examiner*—Richard M. Lorence
*Attorney, Agent, or Firm*—Morgan & Finnegan, LLP

[57] ABSTRACT

A clutch friction wheel for a motor vehicle includes a friction disc which comprises two support elements, each carrying a friction liner fixed to the peripheral portion of the support element, which is extended radially inwardly by a central fastening portion of the support element. A resilient progressive action element or spring is interposed between the inner faces, facing towards each other, of the peripheral portions of the two support elements, and is fixed to at least one of the latter. A locating element is interposed between the inner faces of the central fastening portions and is fixed to the latter. The friction disc is made as a pre-formed unitary sub-assembly, and bayonet fitting means are interposed between the central fastening portion of one of the support elements and the locating element.

11 Claims, 3 Drawing Sheets

FRICTION WHEEL, ESPECIALLY FOR A MOTOR VEHICLE CLUTCH

FIELD OF THE INVENTION

The present invention relates to friction wheels for clutches, or clutch friction wheels, especially for motor vehicles. More particularly, the invention relates to a a clutch friction wheel, especially for a motor vehicle, of the type that includes a friction disc which comprises, firstly, two friction liners, each of which is bonded or moulded to the outer face of the peripheral portion of a support element, which is extended radially inwardly by a central fastening portion, and, secondly, a progressive action element of resilient material constituting a spring, which is interposed between the inner faces, in facing relationship with each other, of the peripheral portions of the two support elements, and which is fixed to at least one of the two support elements, wherein at least one element, constituting a locating element, is interposed between the inner faces of the central fastening portions of the support elements and is secured to the said central fastening portions.

BACKGROUND OF THE INVENTION

A clutch friction wheel of the above kind is disclosed in the specification of French patent application No. 93 15580 filed on 23 Dec. 1993. This arrangement is satisfactory to the extent that it enables the inertia of the clutch friction wheel to be reduced due to the way in which the friction liners are fixed, which enables the thickness of the latter to be reduced while giving good progressive action during gripping of the friction liners between the pressure and reaction plates of the clutch that embodies the clutch friction wheel. In addition, the support elements may be made flat and of low thickness, given that each of them now transmits only one half of the driving torque.

In the above mentioned French patent specification, the locating element is inserted for example before the progressive action element is itself fitted. However, in the light of French published patent specification No. FR 2 673 984 A, it can be seen that this complicates the manufacture of the clutch friction wheel in a mould. In addition, once a sub-assembly has been obtained which consists of the friction disc and its locating element, the operation of fitting together this sub-assembly and the other components of the clutch friction wheel is subsequently made more complicated. In addition, it presents problems as regards handling, transport and storage of the sub-assembly, since there is always a danger of the locating element damaging the progressive action element in these conditions.

DISCUSSION OF THE INVENTION

An object of the present invention is to overcome the above mentioned drawbacks in a simple and inexpensive way.

In accordance with the invention, a clutch friction wheel, especially for a motor vehicle, of the type that includes a friction disc which comprises, firstly, two friction liners, each of which is bonded or moulded to the outer face of the peripheral portion of a support element, which is extended radially inwardly by a central fastening portion, and, secondly, a progressive action element of resilient material constituting a spring, which is interposed between the inner faces, in facing relationship with each other, of the peripheral portions of the two support elements, and which is fixed to at least one of the two support elements, wherein at least one element, constituting a locating element, is interposed between the inner faces of the central fastening portions of the support elements and is secured to the said central fastening portions, is characterised in that the friction disc constitutes a pre-assembled unitary sub-assembly, and in that bayonet fitting means are interposed between one of the central fastening portions of one of the support elements and the said locating element.

Thanks to the invention, it is possible to make the friction disc first, in a first step and in a simple and inexpensive way, and then subsequently to fit it on its locating element.

Thus, the mould in which the clutch friction wheel is formed is simplified, and manufacturing time is reduced because there is no need to store and handle the locating element at this stage. The rate of production can thus be increased. The invention also makes testing and/or quality control of the friction disc simpler to carry out. In addition, the friction liners can easily be ground if desired.

It will also be noted that the friction disc can be stored, handled and transported in the absence of the locating element, so that the progressive action element is in less danger of being damaged.

In another step, which may for example be carried out at a different manufacturing location, the remaining components of the clutch friction wheel can be assembled without the friction disc having to be handled. This then reduces machine downtime and simplifies the assembly of the various components.

The final assembly of the friction disc with its locating element can then be carried out, if desired, in a third manufacturing location, preferably with the friction disc and locating element having been assembled with the other components of the clutch friction wheel beforehand. It will also be noted that control of manufacture can readily be carried out in the second step. All of this enables a high quality clutch friction wheel to be obtained, while at the same time reducing the number of components that need to be provided.

The bayonet fitting involves the provision of passage means, for example in the form of slots, formed in the support element concerned, together with lugs formed in the locating element and projecting radially outwardly of the latter.

The other support element may of course also be provided with passage means, though it is preferred that only one of the support elements has these passage means. The lugs of the locating element are engaged axially in the passage means of the support element, or vice versa. This is easy to achieve because the other support element automatically limits the relative axial movement which is involved. The friction disc is then rotated with respect to the locating element, or vice versa. Finally, the components are secured together, for example by riveting, bolting or welding of the friction disc on the locating element.

The other support element may of course also be provided with passage means, but the latter are then preferably smaller than the lugs, so as to give simplified fitting.

It will be appreciated in addition that the absence of the locating element during the above mentioned first step in the assembly operation gives improved protection to the progressive action element, especially because of the lightening in weight which is due to the absence of the locating element. This also enables fewer precautions to be necessary during handling and transport of the friction disc, which is made in the said first step into a unitary assembly that can be handled and transported with reduced risk of any damage.

All of the foregoing is beneficial, in particular when the progressive action element is of the cellular type as disclosed in French patent specification No. FR 2 673 984 A, or where it consists of a plurality of projections as in U.S. Pat. No. 5,076,409.

In addition, there is an overall reduction in the danger of error as regards proper selection of the various components in store, because it is possible to make a plurality of sub-assemblies which can be controlled and tested in manufacture separately.

It will be appreciated that the locating element may be of a circumferentially continuous type, or that it may alternatively consist of a plurality of separate members in the form of lugs, according to the particular application, and for example according to whether the locating element consists of a guide ring or a damper plate, either of which the clutch friction wheel commonly incorporates. In other versions, the locating element may be a separate component attached to such a guide ring or damper plate.

It will be appreciated that the invention affords the possibility of making the clutch friction wheel in numerous different ways.

Finally, the bayonet fitting means are such as to favour ventilation and flexibility of the friction disc, while the latter retains a high degree of robustness. For this reason, it is preferable that the lugs should be elongated circumferentially, and that one of the support elements should be without the above mentioned passage means.

Further features and advantages of the invention will appear on a reading of the detailed description of preferred embodiments of the present invention, which is given below by way of example only and with reference to the accompanying drawings.

DESCRIPTION OF PREFERRED EMBODIMENTS OF THE INVENTION

Figure 1:
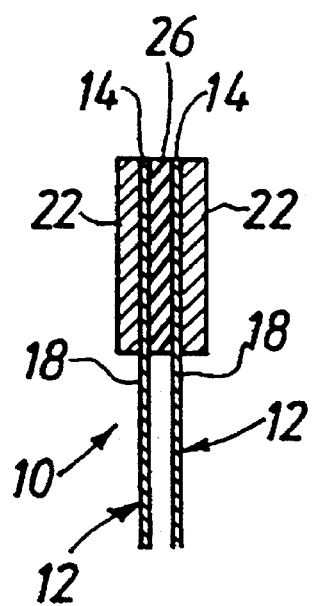
FIG. 1 is a view in axial cross section showing part of a clutch friction disc.

The friction disc 10 shown in the drawings is part of a clutch friction wheel for motor vehicles, and constitutes the input element of the latter.

As is known, a clutch friction wheel comprises an output element 1 in the form of a hub which is splined internally for coupling the clutch friction wheel to the input shaft of the gearbox, for rotation of the latter with it. The clutch friction wheel also includes two guide rings 51 and 52, which are disposed on either side of a damper plate 50, with the guide rings 51, 52 and the damper plate 50 surrounding the hub 1.

Figure 2:
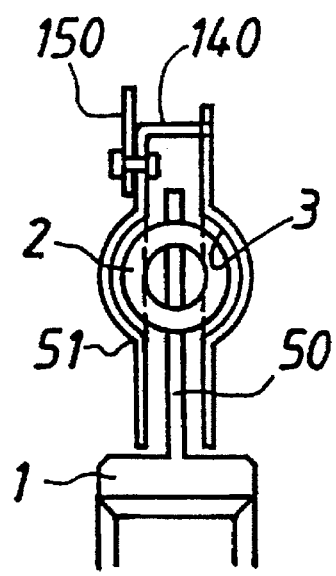
FIG. 2 is a half view in cross section, showing a clutch friction wheel with its friction disc omitted.
Figure 4:
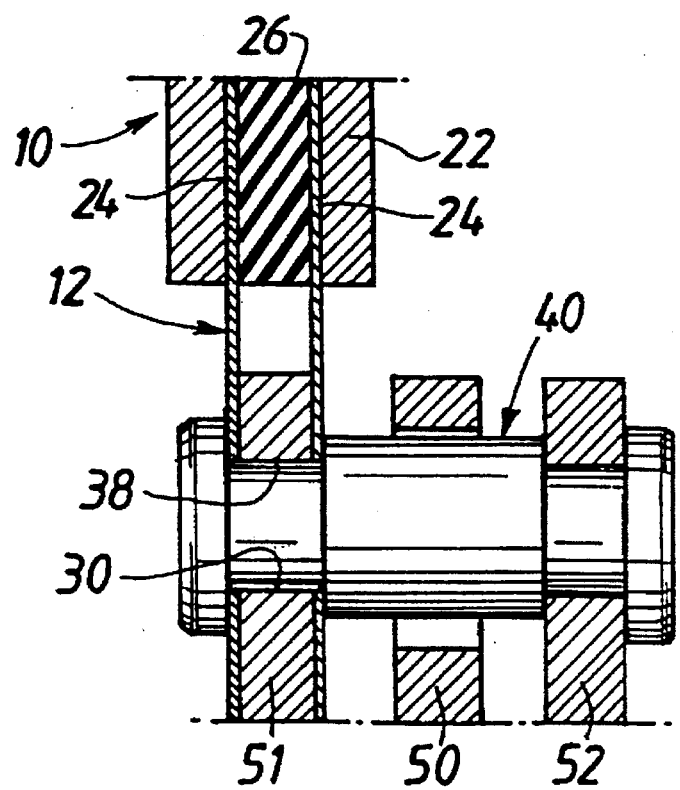
FIG. 4 is a view in axial cross section showing part of the clutch friction wheel mounted on its locating element.

In one embodiment, shown in FIGS. 2 and 4, the guide rings 51 and 52 are fixed to the friction disc 10 and surround the hub 1, on which they are freely rotatable, while the damper plate 50 is fixed to the hub 1 for rotation with the latter. However, the coupling between the damper plate 50 and the hub 1 may be such that there is a predetermined circumferential clearance which is taken up before the damper plate 50 starts rotating, the coupling accordingly including loose coupling means.

Figure 3:
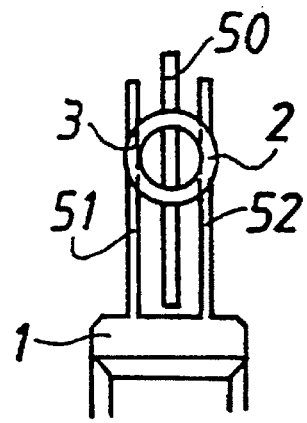
FIG. 3 is a view similar to FIG. 2, for another embodiment of the invention.

In another embodiment shown in FIG. 3, the structures are reversed in such a way that the guide rings 51 and 52 are fixed to the hub 1, while the damper plate 50 that surrounds the hub 1 is freely rotatable on it, the damper plate accordingly being fixed to the friction disc 10.

In all cases, circumferentially acting resilient members, which commonly consist of coil springs but which, in a modification, may consist of blocks of resilient material such as an elastomer in association with coil springs, are mounted in seatings 3 which are formed in facing relationship with each other in the guide rings 51 and 52 and in the damper plate 50. The resilient members 2, which are usually arranged to act in stages, provide an elastic coupling between the input element 10 and the output element 1.

In the first embodiment (see FIGS. 2 and 4), spacer elements 40, 140 connect and secure together the guide rings 51 and 52. These spacer elements may consist of fastening bars 40 which extend through the damper plate 50 with a circumferential clearance, so as to limit the angular displacement between the damper plate 50 and the guide rings 51 and 52. In that case, the bars 40 also serve to fasten the disc 10.

In another version, the spacer elements may consist of an axially oriented flange 140, which is formed for example on the guide ring 51 at its outer periphery, and which is itself formed with mortices. The other guide ring then has tenons which engage in these mortices, assembly being carried out by seaming along the edges of the mortices so as to provoke plastic flow of the material, which thereby encroaches on the tenons in the manner described, for example, in French patent specification No. FR 2 411 999 A. It will be noted, incidentally, that the seatings 3 may consist of windows as in FIG. 3, or press-formed depressions as shown in FIG. 2.

The friction disc 10 consists essentially of two parallel, radial, support elements 12, each of which is press-formed from a thin metal sheet. Each support element 12, which in this example are flat, generally annular, metallic members, comprises a peripheral portion 14 on the radially outward side and having a generally continuous annular form, and a central fastening portion 18 which extends the peripheral portion 14 radially inwardly. It can of course be arranged, in a modified version, that the annular peripheral portion 14 of the support element 12 is discontinuous, that is to say the element 12 has a multiplicity of radial pressed-out portions which thereby enable successive radial tongues to be formed.

The two support elements 12 have a common axis, and each of them serves as a support for a liner 22 of a suitable friction material. In the context of a clutch friction wheel, these liners 22, in a manner known per se, are arranged to be gripped between the pressure and reaction plates of the clutch, while the hub is arranged to be coupled in rotation, in the manner mentioned above, with the input shaft of the gearbox.

Each friction liner 22 is secured by being bonded, for example by adhesive bonding, brazing or moulding in place, on the annular portion of the outer face 24 of the corresponding support element 12, as shown in FIG. 4.

In the way known per se, a progressive action element, in the form of a continuous ring 24 of elastic material which constitutes a spring, is interposed between the inner faces, in facing relationship with each other, of the support elements 12 in their peripheral zone, on the opposite side of the latter from the annular and coaxial friction liners 22. However, without departing from the scope of the present invention, the ring 26 can equally well be discontinuous, being for example in the form of separate pads which are disposed between the above mentioned inner faces of the support elements 12.

The ring 26 may be formed of a suitable cellular material having cells or pores which are open and/or closed, and which, under the effect of compressive stresses, enable the thickness of the material to be caused to be reduced. When these stresses cease, the ring releaxes so that its thickness returns to its original value.

The ring 26 can be made from materials in the group which includes elastomeric foams. For more detail about this, reference should be made to the above mentioned French patent specification FR 2 673 984 A. However, in a modified version, it may be made with a plurality of projecting elements of elastic material, as described in U.S. Pat. No. 5,076,409. In both cases, the progressive action element consisting of a ring 26 or projecting elements of resilient material, such as an elastomer, are fixed by bonding, for example by adhesive bonding or in situ vulcanisation, to the mutually facing inner faces of the support elements 12.

Some of the above mentioned projecting elements may of course be secured to only one of the support elements, in the manner described in U.S. Pat. No. 5,076,409.

Referring now to FIG. 4, aligned holes 30 are formed in the central fastening portion 18 of each support element 12, so as to enable securing members, such as the bars 40 or rivets, to pass through them so as to fasten the support elements 12 in place and fasten the friction disc 10 in position. In the present case, and in accordance with one feature of the invention, a unitary sub-assembly is formed in advance, this sub-assembly consisting of the friction disc 10.

As regards the manufacture of this unitary sub-assembly, reference should be made for example to French patent specification No. FR 2 673 984 A, and particularly to FIG. 3 of the latter, which shows the relevant mould.

The friction disc 10 is adapted to be mounted on a locating element, which constitutes a support for the friction disc. This locating element is adapted to be interposed between the inner faces of the central fastening portions 18 of the support elements 12, to which it is fixed. More precisely, and in accordance with one feature of the invention, a bayonet fitting means 9 is interposed between one of the central fastening portions 18 of one of the support elements 12 and the locating element.

In the embodiment shown in FIG. 4, the above mentioned locating element consists of the guide ring 51 which surrounds the hub 1 with a clearance, and which in this example is pre-assembled with the other components of the clutch friction wheel. The guide ring 51 has seatings defined by press-formed depressions 3 (see FIG. 2). In this embodiment, the guide ring 51 has circumferentially elongated lugs 60 which project outwardly from its radially outermost perimeter so as to define slots 61 in circumferential alternation with them.

The support element 12, which in this case is the one which is arranged to be the closer of the two to the damper plate 50 after assembly, has at its inner periphery passage means in the form of slots 71. These slots 71, which are open on their radially inward side, are disposed in circumferential alternation with lugs 70 which project radially towards the axis of the assembly.

It will be noted that in the embodiment shown, the slots 71 and the lugs 60 are complementary with each other, and that the same is true for the lugs 70 and the slots 61. The lugs 70 and 60 are provided with at least one hole 30, and in this example two holes 30, which are aligned with each other after assembly.

The other support element 12, i.e. the one which is the more remote from the damper plate 50, does not have the passage means such as the slots 71, so that it is of continuous form.

Figure 5:
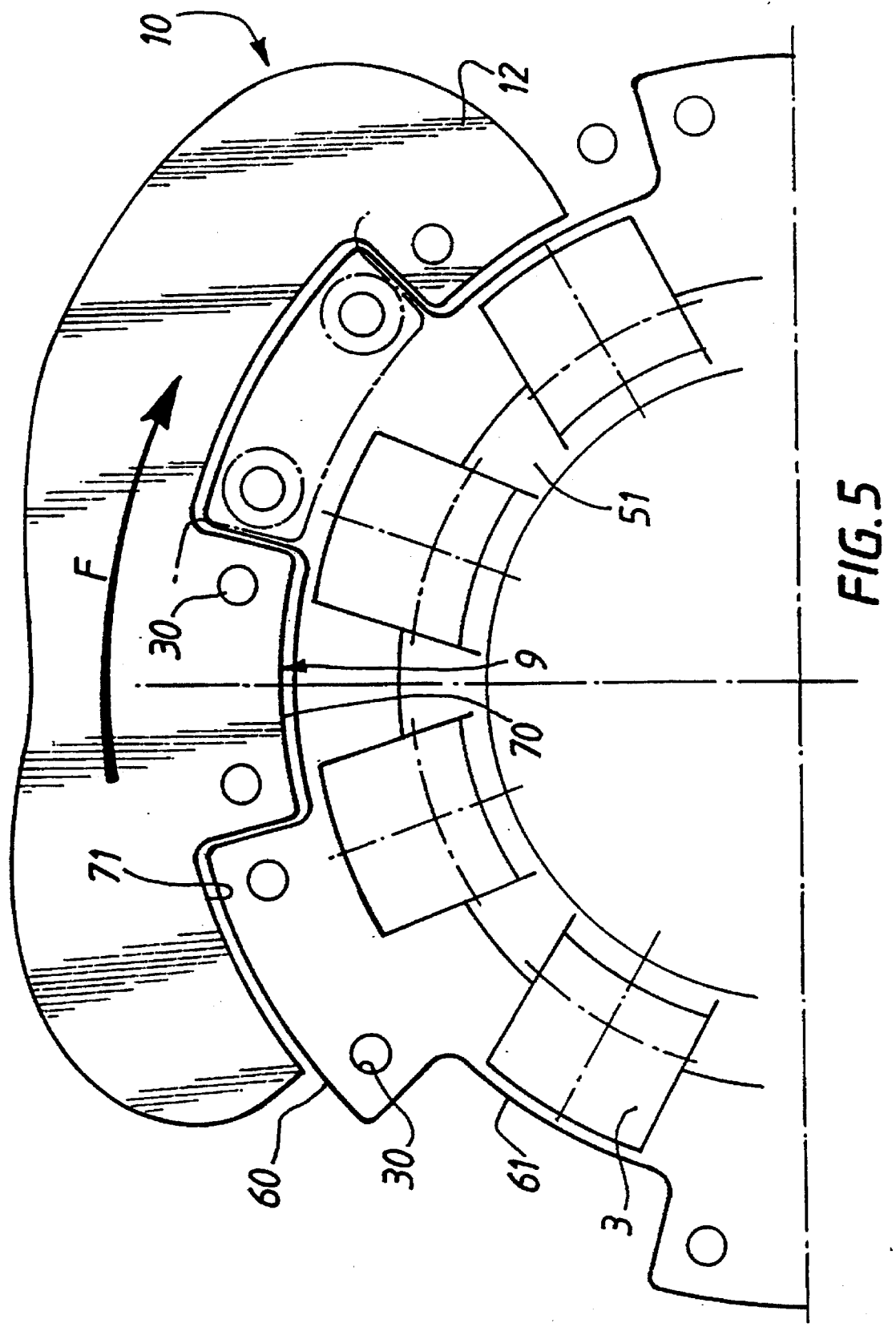
FIG. 5 is a front view showing the bayonet fastening means according to the invention.

As will be understood from the foregoing, the lugs 60 are engaged axially in the slots 71 (or vice versa), and the locating element 51 is then rotated in the direction of the arrow F (FIG. 5) with respect to the support element 12, so as to bring the lugs 60 and 70 into coincidence, and also to bring the holes 30 into alignment as mentioned above. The spacing between two holes 30 is of course the same in the lugs 60 and 70, which in the present case are of matching shapes and mounted in head-to-toe relationship with each other.

After this rotational movement has taken place, the two guide rings 51 and 52 are fastened together by means of the fastening bars 40, which are passed through the damper plate 50.

Figure 6:
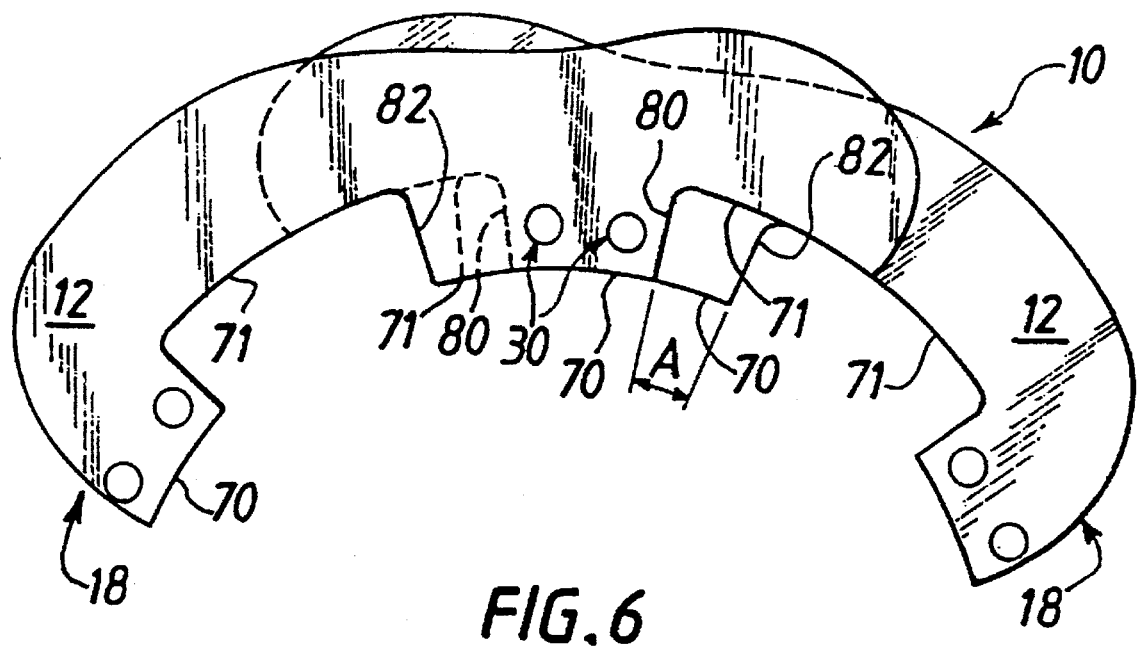
FIG. 6 is a frnt view showing part of the friction disc in another embodiment of the invention.

The friction disc 10 may, and preferably does, consist of two identical support elements 12, as is best seen in FIG. 6. Each support element 12 has a succession of slots 71 and lugs 70, of the kind described above, on its central fastening portion 18. Each lug 70 has two through holes 30, which enable securing members to be passed through them for gripping and fastening the friction disc 10. As is again best seen in FIG. 6, one of these holes 30 is located close to one of the radial edges of the lug 70, while the other hole 30 is spaced away from the other radial edge 82 of the lug 70.

In order to make the sub-assembly consisting of the friction disc 10, it is arranged that one of the support elements 12 is offset circumferentially with respect to the other support element 12, while it is also preferably arranged that they are mounted in opposition to each other in such a way that the radial edge 80 of the lug 70 of one of the support elements lies at a circumferential distance A from the radial edge 82, in facing relationship with it, of the lug of the other support element 12, while the holes 30 in one of the support elements 12 are in communication with the holes 30 of the other support element 12.

Thanks to this opposed relationship, it will be seen that manufacture of the support element 12 can be standardised. The opposed relationship is obtained by locating one of the support elements 12 in facing relationship with the other, after it has been rotated through 180 degrees about a diametral axis, so as to reach the configuration which has been described above with reference to FIG. 6.

Figure 7:
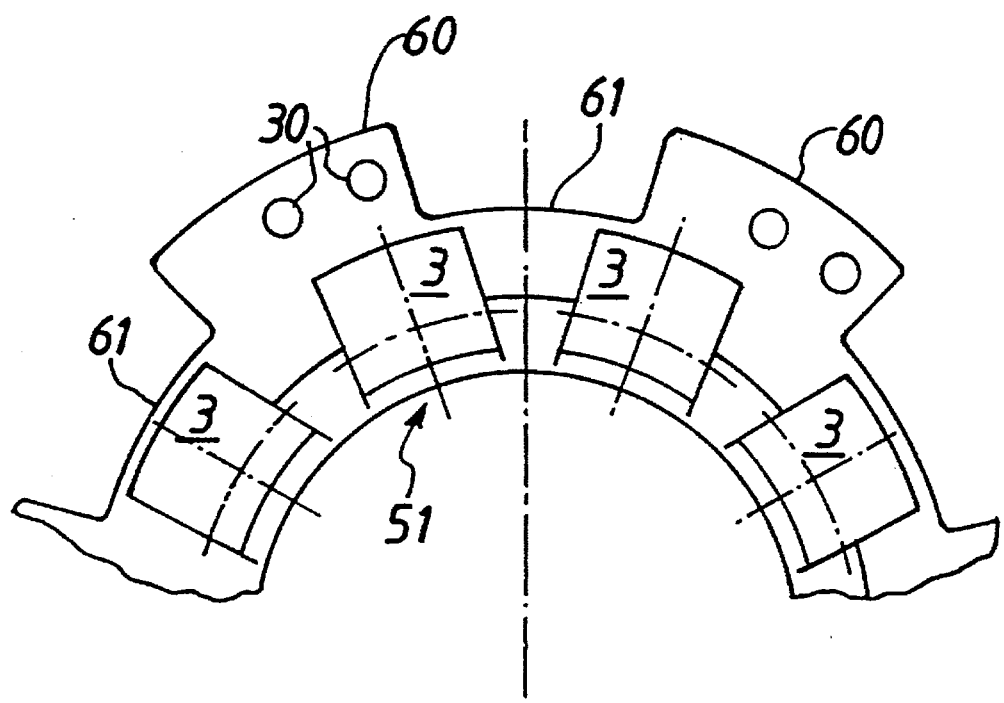
FIG. 7 is a front view showing part of a locating element for cooperation with the friction disc of FIG. 6.

Reference is now made to FIG. 7, in which the locating element 51 is substantially identical to that described above with reference to FIG. 5, except as regards the position of the holes 30.

The lugs 60 of the locating element, which in this case is the guide ring 51, have holes 30, the location of which is substantially identical with that of the holes 30 of the support element 12. More precisely, one of the holes 30 of the locating element 51 is located close to one of the radial edges of the lug 60, while its other hole 30 lies spaced away from the other radial edge of the lug, with the spacing between these two holes being equal to the spacing between the two corresponding holes 30 of the support elements 12.

In the assembly operation, which is substantially identical to that described above, the lugs 60 are engaged in the slots 71 or vice versa, after which clockwise rotation is carried out such as to bring the holes 30 in the locating element 51 into coincidence with the holes 30 of the support elements 12. In this arrangement, the lug 60 will be masked by the lug 70 of one of the support elements, so as to engage on a portion of the lug 70 of the other support element 12.

The present invention is of course not limited to the embodiments described above. In particular, the locating element may consist of the damper plate 50 of FIG. 3.

In another version, the locating element, 150, FIG. 2, may be backed on to the guide ring 51, and secured to the latter by means of rivets. In this case, the element 150 may be a single component in the form of a crown which is crenellated at its outer periphery; or, in a modified version, it may consist of a number of separate lugs which are fixed on the guide ring 51. The support element 12 then has slots and lugs 70 as in FIG. 5. This support element may be either one of the two support elements 12, because in this case the locating element 150 extends radially outwardly from the spacer element 140. Again in this case, the friction disc is secured to its locating element by riveting.

In another version, the locating element may of course consist of the damper plate 50 of FIG. 2, which is fixed to the hub 1, with the clutch friction wheel being rigid in this case, with no progressive action spring or guide rings.

In a further version, the lugs 60 may for example have a penetrating form, with the support element 12 having lugs for guiding the introduction of the lugs of the locating element.

It may also be envisaged that the thickness of the locating element 51 is different in the region of its lugs from the thickness in the remainder of the locating element. In this connection, it can be arranged that the lugs 60 are shorter in the axial direction than the remainder of the locating element 51, or longer than the remainder of this element, according to whether the sub-assembly is mounted on the damper plate or on the guide ring, as has already been mentioned above.

As will have been understood, the progressive action element, such as the ring 26 or equivalent projections, constitute an element of resilient material defining a spring. It gives progressive action because this element is adapted to be compressed progressively. The element 26 may extend radially further inwardly than the friction liners 22.

The components may of course be fastened by welding or by means of bolts, instead of fastening bars or rivets.

In all cases, however, the locating element is interposed between the inner faces of the central fastening portions 18 of the support elements, and is secured to the latter.

What is claimed is:

1. A clutch friction wheel defining an axis of rotation and including a friction disc, the friction disc comprising: two support elements, each support element having a peripheral portion, each said peripheral portion having an inner face and an outer face, the said inner faces thereof being in facing relationship with each other, each support element further having a central fastening portion, each of which defines an inner face thereof, each said central fastening portion being an extension of the associated said peripheral portion radially towards the axis of rotation; two friction liners, each said friction liner being bonded on the said outer face of the peripheral portion of a respective one of the said support elements; a progressive action element of elastic material constituting a spring and interposed between the said inner faces of the peripheral portions of the said support elements, the said progressive action element being fixed to at least one of the support elements; and at least one locating element interposed between, and fixed to, the said inner faces of the central fastening portions of the support elements, wherein the friction disc is a unitary pre-assembled sub-assembly, with the central fastening portion of one of the said support elements, and the said locating element, together defining bayonet fitting means for fitting that support element and the locating element together.

2. A clutch friction wheel according to claim 1, wherein the said locating element has first lugs projecting radially from its outer periphery, the said lugs defining part of the said bayonet fitting means.

3. A clutch friction wheel according to claim 2, wherein the said first lugs are elongated circumferentially.

4. A clutch friction wheel according to claim 1, wherein at least one of the said support elements defines passage means.

5. A clutch friction wheel according to claim 4, wherein at least one of the said support elements has slots open towards the said axis of rotation and constituting the said passage means.

6. A clutch friction wheel according to claim 1, wherein the said locating element is continuous and defines first lugs and first slots arranged alternately with said first lugs.

7. A clutch friction wheel according to claim 5, wherein the said locating element is continuous and defines first lugs and first slots arranged alternately with each other, and wherein a said support element has second slots and second lugs disposed alternately with said second slots, the said second slots and second lugs being complementary to the said first lugs and first slots, respectively, of the locating element.

8. A clutch friction wheel according to claim 1, wherein the said locating element is discontinuous, and includes a plurality of circumferentially elongated lugs.

9. A clutch friction disc according to claim 7, wherein each said support element has said second slots and second lugs disposed alternately with the said second slots, the said second slots and second lugs being complementary to the said first lugs and first slots, respectively, of the locating element, and wherein one of the support elements is offset circumferentially with respect to the other support element.

10. A clutch friction wheel according to claim 9, wherein the said support elements are disposed in opposed relationship to each other.

11. A clutch friction wheel according to claim 2, wherein the said first lugs are of different axial thickness from the remainder of the locating element.

* * * * *